United States Patent [19]

Kojima et al.

[11] Patent Number: 4,649,401

[45] Date of Patent: Mar. 10, 1987

[54] THERMAL RECORDING APPARATUS

[75] Inventors: Yasuyuki Kojima; Nagaharu Hamada, both of Hitachi; Yasuro Hori, Katsuta, all of Japan

[73] Assignee: Hitachi, Ltd., Tokyo, Japan

[21] Appl. No.: 742,239

[22] Filed: Jun. 7, 1985

[30] Foreign Application Priority Data

Jun. 8, 1984 [JP] Japan .................................. 59-116464

[51] Int. Cl.⁴ ............................................. G01D 15/10
[52] U.S. Cl. ................................. 346/76 PH; 400/120; 364/519
[58] Field of Search ................... 346/76 PH; 400/120; 219/216 PH; 364/518–520

[56] References Cited

U.S. PATENT DOCUMENTS 4,415,907 11/1983 Suemori ..................... 346/76 PH
4,464,669 8/1984 Sekiya et al. ................ 346/76 PH Primary Examiner—Arthur G. Evans
Attorney, Agent, or Firm—Antonelli, Terry & Wands

[57] ABSTRACT

A thermal recording apparatus has a thermal recording head constituted by heating elements disposed in parallel, a driver circuit actuated in response to a recording signal, and a control circuit which controls the driver circuit. The apparatus is arranged such that, when data in a memory which stores recording data to be output to the control circuit is transferred to a register in the driver circuit, an address signal for reading out the recording data in the memory is output to the driver circuit simultaneously with the recording data in the memory, thereby selecting a register in the driver circuit.

9 Claims, 9 Drawing Figures

THERMAL RECORDING APPARATUS

FIELD OF THE INVENTION

The present invention relates to a thermal recording apparatus and, more particularly, to a thermal recording apparatus and a driver IC (integrated circuit) which may be suitably employed to drive a multiplicity of heating elements at high speed.

BACKGROUND OF THE INVENTION

A thermal recording apparatus is, as shown in FIG. 1, generally composed of a thermal recording head 1, a driver 2 and a control circuit 3. The thermal recording head 1 is constituted by a multiplicity of heating elements which are disposed in parallel. The driver 2 is constituted by a multiplicity of driver circuits adapted to drive the respective heating element blocks of the thermal recording head 2 in response to recording signals. The control circuit 3 is adapted to distribute recording signals to the driver circuits in accordance with a recording procedure and to control driving conditions. An apparatus, such as a facsimile machine, which is required to drive a multiplicity of heating elements employs the heating element portion and the driver circuits as one integrated block. In recent thermal recording apparatus in particular, a device in which heating elements are disposed in parallel is prepared by employing a thin- or thick-film printing technique. It is also common to form the driver circuits into an IC in which the driver circuits are mounted on the same substrate.

A thermal recording apparatus of this type is disclosed, for example, in the specification of Japanese Patent Laid-Open No. 44584/1983 "Control Circuit for Matrix Recording" laid open in Japan on Mar. 15, 1983 and shown in the accompanying drawings FIGS. 1 and 2.

The above-described prior art, however, involves a limited data transfer speed, which disadvantageously makes it difficult to realize an apparatus having an improved operation performance. Further, the control circuit 3 and the driver 2 internally handle recording data, bit-by-bit, in parallel, but to effect data transfer it is necessary for the control circuit 3 to incorporate a parallel-to-serial conversion circuit and for the driver 2 to incorporate a serial-to-parallel conversion circuit, which fact disadvantageously involves a large number of required circuit elements.

SUMMARY OF THE INVENTION It is a primary object of the present invention to provide a novel thermal recording apparatus which is capable of reducing the size of its constituent circuits while obtaining high operation performance (high-speed recording data transfer).

To this end, the present invention provides a thermal recording apparatus which has: an output driver connected to a heating element; a gate which ON/OFF controls the output driver; a latch which temporarily stores a recording signal which is to be output to the gate; a driver circuit connected to the latch and having parallel data input terminals; and a control circuit which incorporates a microprocessor to which the driver circuit is coupled through a bus, the driver circuit having a register connected to the control circuit in such a manner that the register is equivalent to, for example, a memory connected to a microcomputer bus as will be clear from the description made later, whereby recording data is transferred at high speed by parallel buses.

BRIEF DESCRIPTION OF THE DRAWINGS

FIGS. 5, 5a, 5b, 5c is a flow chart corresponding to a program stored in a microprocessor incorporated in the control circuit shown in FIG. 4;

DETAILED DESCRIPTION OF THE PREFERRED EMBODIMENT

Figure 2:
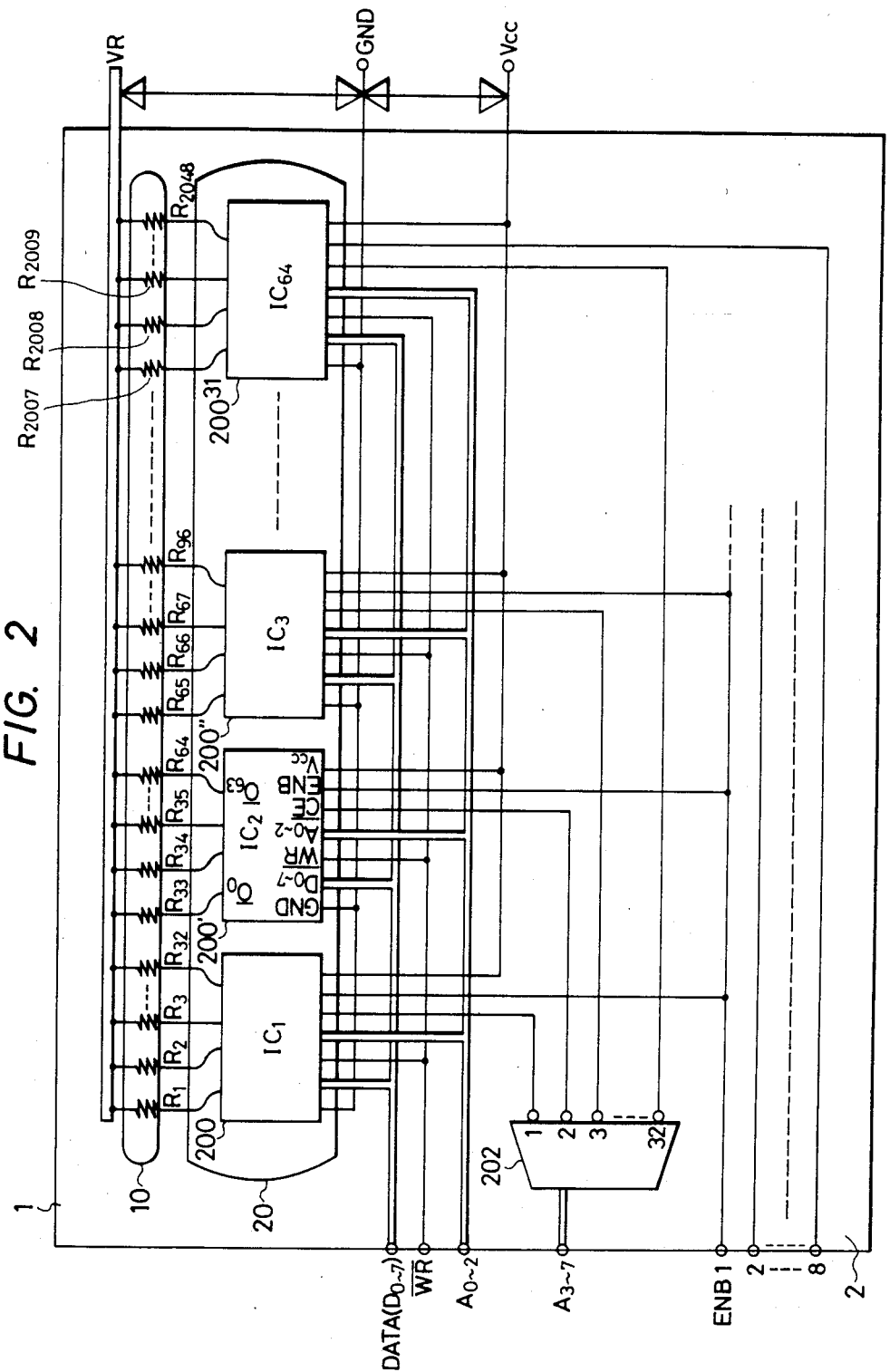
FIG. 2 is a circuit diagram of a driver and a thermal recording head employed in the thermal recording apparatus according to the present invention.

Referring first to FIG. 2 which shows a thermal recording head and a driver in a combined fashion, heating (resistor) elements 10 are constituted by 2,048 resistors $R_1$, $R_2$, $R_3$ ... $R_{2048}$. Driver ICs 200 are respectively constituted by integrated circuits $IC_1$, $IC_2$, $IC_3$ ... $IC_{64}$. Each driver IC 200 has 32 output terminals each of which is connected to one of the ends of a respective one of the resistors which constitute the corresponding block of the heating elements 10. The other end of each of the resistors is connected to a common line. Each driver IC 200 has input and output terminals for recording data. Each of the output terminals of each IC 200 is connected to one of the terminals of the corresponding heating element. On the other hand, the respective recording data input terminals $D_0$ to $D_7$ of the ICs 200 are mutually connected. Each IC 200 has terminals for a storage timing pulse $\overline{WR}$ and address signals $A_0$ to $A_2$ employed to select groups within the chip. These terminals of the ICs 200 are also mutually connected, respectively. However, the terminal of each IC 200 for a chip enable signal $\overline{CE}$ is individually connected to a decoder 202. The decoder 202 is adapted to select the ICs 200 to which recording data is to be input through input terminals $A_3$ to $A_7$. The respective ENB terminals of the ICs 200 are divided into eight groups in such a manner that each group consists of four ENB terminals, and the eight groups are respectively connected to eight input terminals ENB 1 to ENB 8. Each IC 200 incorporates temporary storage circuits (latches) $37$ to $37^{63}$ (described later) which may be regarded as constituting in combination a memory having the same data width as that of a microcomputer which can be selected as desired by the address signals $A^0$ to $A^7$. In consequence, the data written in this memory is directly transmitted to the corresponding heating element block.

Figure 3:
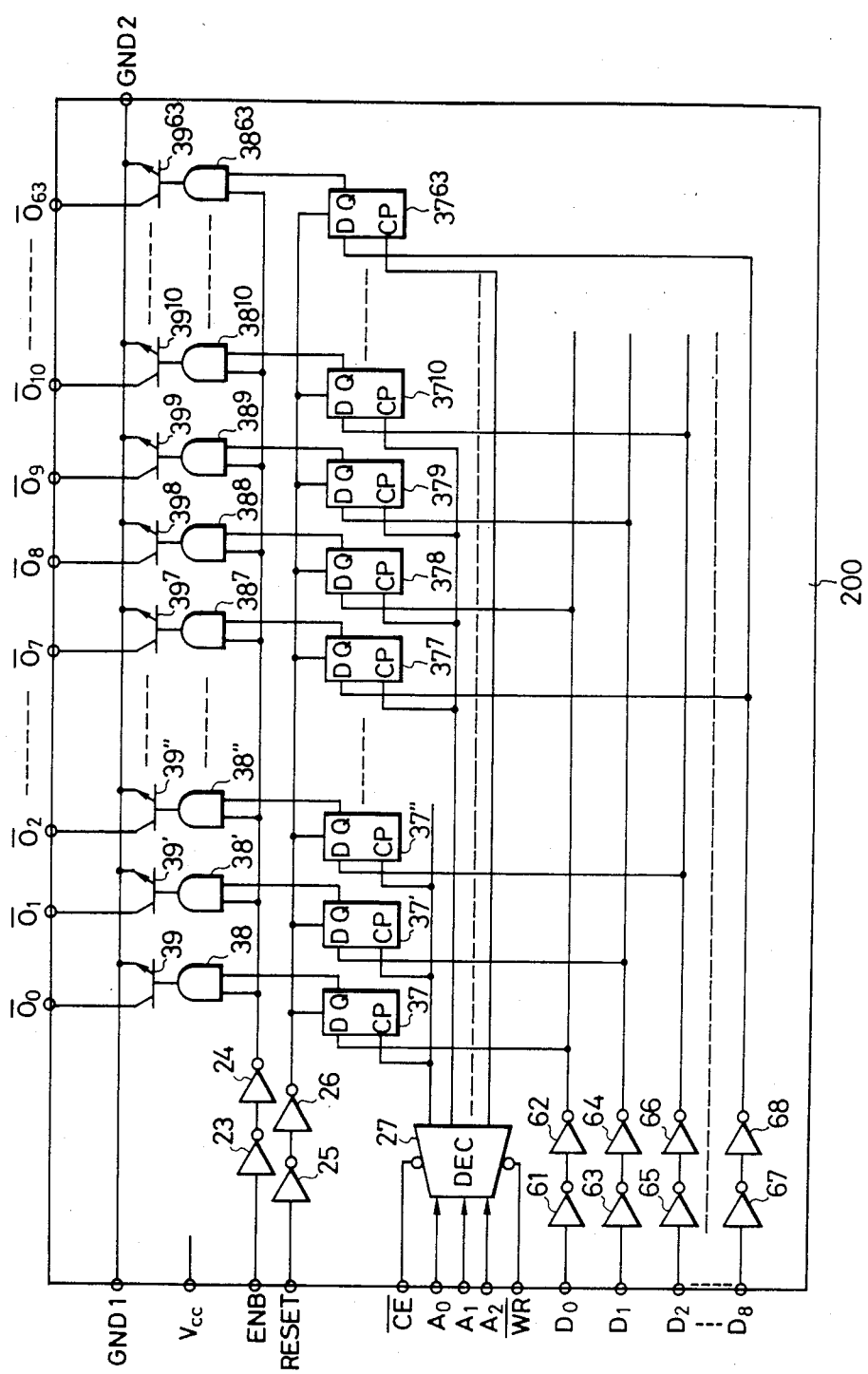
FIG. 3 shows one example of a driver circuit constituting the driver shown in FIG. 2.

Input signals $D_0$ to $D_7$ which are synchronized with the chip enable signal CE, the address signals $A_0$ to $A_2$ and the data write signal WR from an address decoder 48 (described later) are successively transferred into the temporary storage circuits $37$ to $37_{63}$ which operate to latch the respective outputs of the shift registers $37$ to $37^{63}$ at a predetermined timing in accordance with the inputs to a decoder 27. The respective values of the latched data are ANDed with the gate signal ENB by AND circuits (gates) 38 to $38^{63}$, whereby the supply of the data to output transistors (output drivers) 39 to $39^{63}$ is gated. Each of the output transistors 39 to $39^{63}$ is adapted to switch the load connected to its output terminal in accordance with the gated data. More specifically, each of the ICs 200 in accordance with the present invention is adapted to input its input signals as parallel signals from the output drivers, as will be clear from the description made later in relation to FIGS. 4 to 6. The IC 200 is further adapted to temporarily store recording data during a recording operation and to be able to control the width of the recording pulse which is actually applied to the load. The inside of each IC 200 is arranged in the manner shown in FIG. 3. In the Figure: the reference numerals 23 to 26 and 61 the 68 denote inverting logic circuits; 37, 37', 37'', 37''' ... $37^{63}$ temporary storage circuits (latches); 38, 38', 38'', 38''' ... $38^{63}$ AND circuits (gates); and 39, 39', 39'', 39''' ... $39^{63}$ output transistors (output drivers). The temporary storage circuits 37 to $37^{63}$ are, as illustrated, successively divided into eight groups and recording signals from the terminals $D_0$ to $D_7$ are applied to each of the eight groups via respective input buffers which are constituted by inverters 61 to 68. Further, as a storage timing signal for the eight groups of temporary storage circuits 37 to $37^{63}$, each of these groups consisting of eight of them, the output of the storage timing generating circuit 27 is employed, this circuit being mainly constituted by the address decoder (Dec). More specifically, the circuit 27 is adapted to supply the storage timing pulse $\overline{WR}$ to temporary storage circuits for eight bits selected in accordance with the chip enable signal $\overline{CE}$ which represents the fact that data is to be input to this circuit and the address signals $A_0$ to $A_2$ for selecting groups within the chip, thereby storing the recording data which has been input to the terminals $D_0$ to $D_7$. The storage operation is selective at random by means of the chip enable signal $\overline{CE}$ and the address signals $A_0$ to $A_2$. The stored recording data is fed to the output transistors 39 to $39^{63}$ in response to the gate signal ENB for ON/OFF controlling the driver output.

Figure 1:
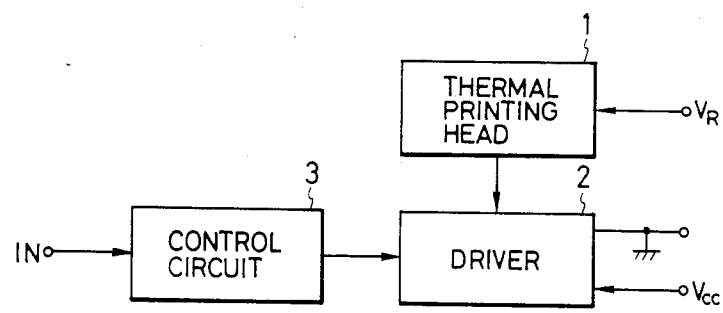
FIG. 1 is a functional block diagram of the whole arrangement of a thermal recording apparatus to which the present is applied.
Figure 4:
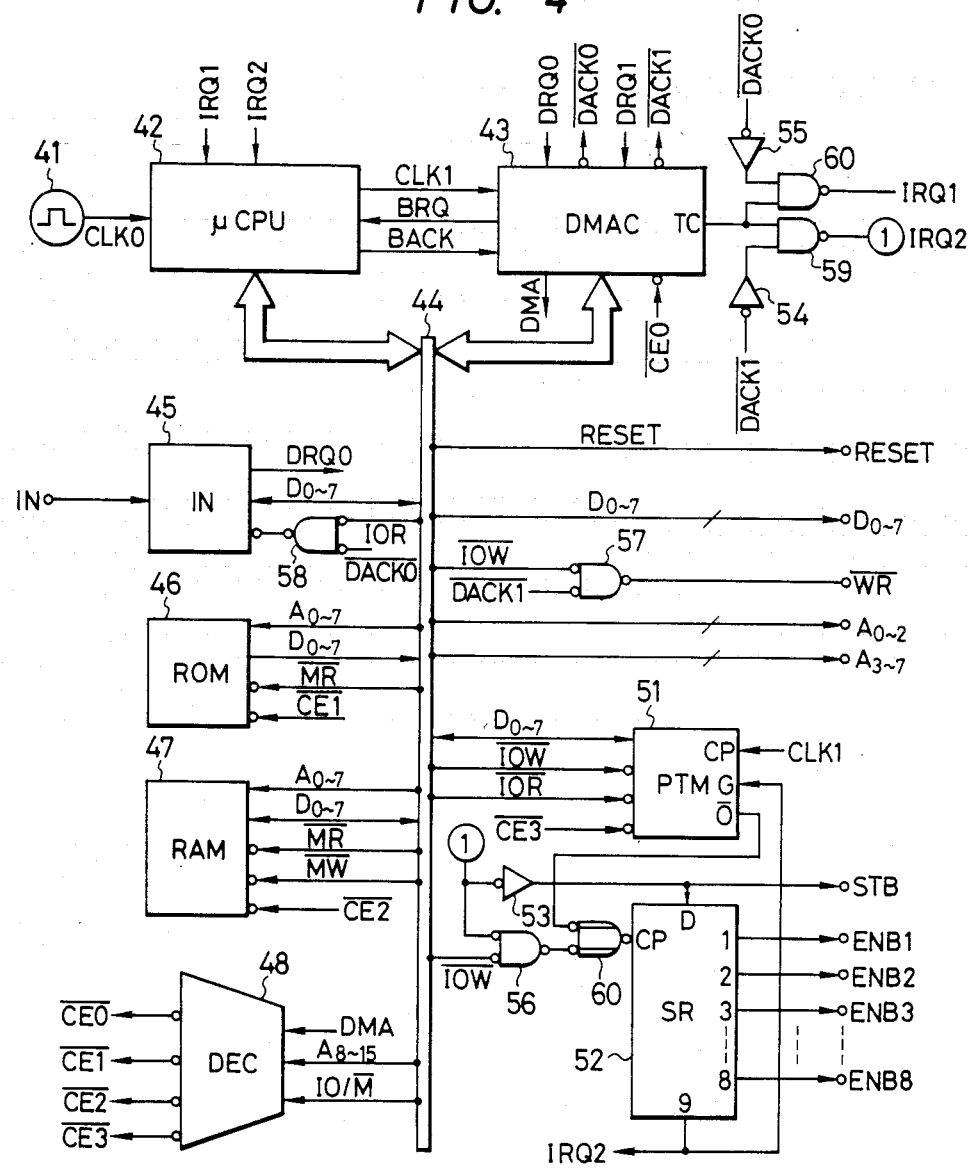
FIG. 4 shows one example of a control circuit employed in the thermal recording apparatus according to the present invention.
Figure 5A:
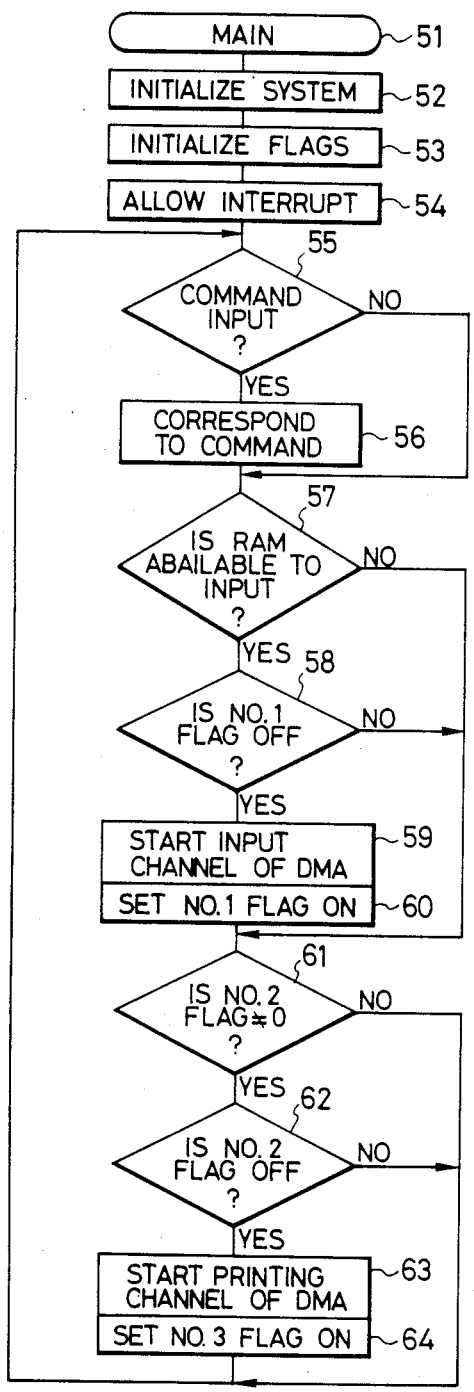
Figure 5B:
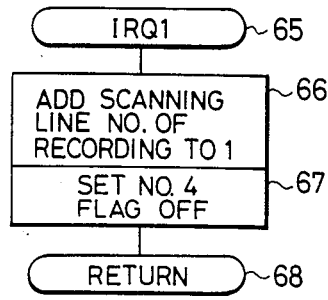

Referring next to FIG. 4 which shows a control circuit 3 which is connected to the driver 2 shown in FIG. 1, a generator 41 generates a main timing clock CLKO for a microprocessor 42. A direct memory access controller (referred to as a "DMAC", hereinafter) 43 directly executes data transfer processing at high speed in place of the microprocessor 42. A bus 44 is employed to transmit signals which are generated by the microprocessor 42 and the DMAC 43. An input circuit 45 is adapted to input commands and recording data IN to the control circuit from external devices. A memory (ROM) 46 stores a program for microcomputer operations and data required for processings. A memory (RAM) 47 which allows data to be written into and read out from it temporarily stores data required for the program operation and input commands and recording data. An address decoder 48 generates address signals CE0 to CE3 which are employed to supply data from the memories and the input/output elements to the bus 44. A programmable timer PTM 51 generates a clock signal with an interval which is specified by the microprocessor 42. A shift register 52 outputs signals ENB1 to ENB8 which are employed to control the period of time for recording effected by the driver 2. Further, the reference numerals 53 to 55 denote inverting circuits, 56 to 58 negative-logic AND circuits, and 59 and 60 AND circuits. The above-described circuit elements are connected in the manner shown in FIG. 4 and adapted to operate in accordance with the following programs and timings.

Figure 5C:
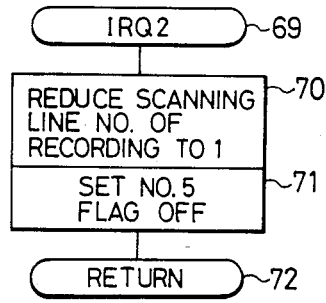
Figure 6:
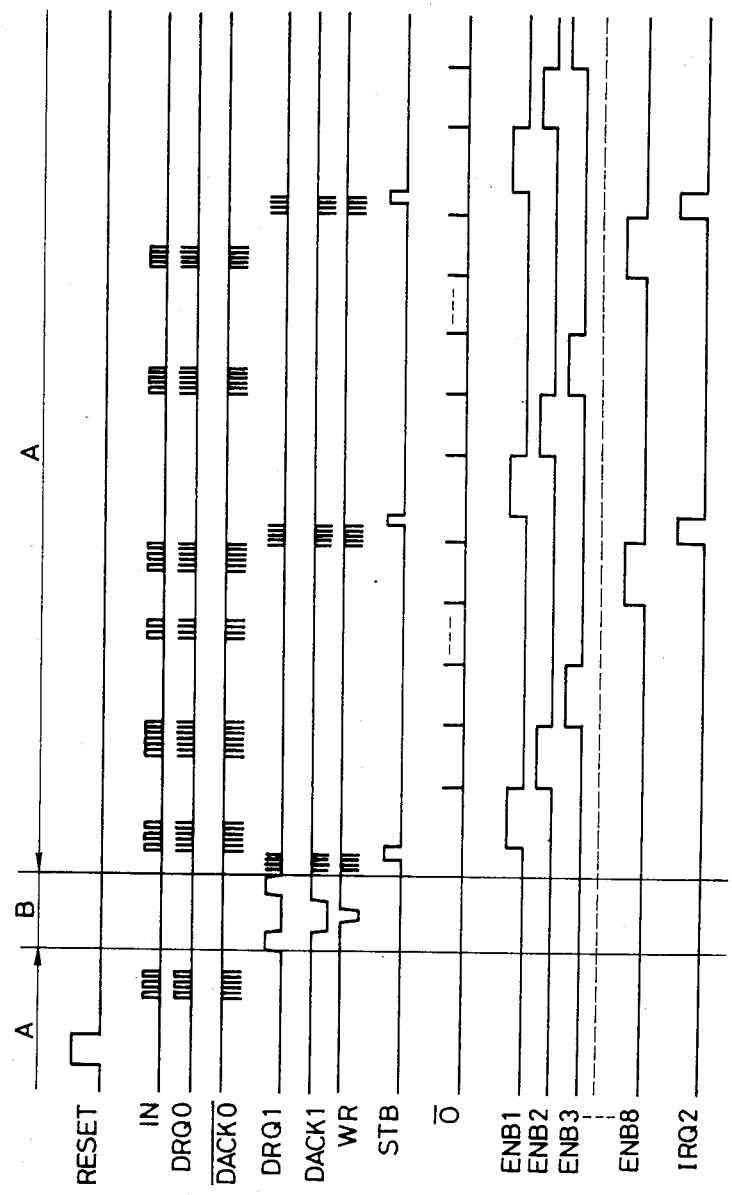
FIG. 6 is a timing chart showing the operation of the control circuit shown in FIG. 4.

FIGS. 5 and 6 are a flow chart and a timing chart, respectively, and show the operation of the control circuit 3 in accordance with the embodiment of the present invention.

The programs operate as follows. Namely, interrupt requests IRQ1 and IRQ2 are disallowed by a reset pulse which is generated by the microprocessor 42 in a circuit manner when the power supply for the apparatus is turned on, and a main program 51 shown in FIG. 5A operates alone. According to the instructions from the microprocessor 42, the main program 51 effects initialization of the various input/output elements (the programmable timer (PTM) 51, the shift register (SR) 52 and the DMAC 43 which is actuated by the BACK signal from the microprocessor 42) and initialization of, for example, the RAM 47 for processing in steps 52 and 53 (initialization of the system and resetting of flags (OFF), respectively). The main program 51 allows interruption in a step 54.

In this embodiment, interruption is requested by the DMAC 43 when it completes transferring one block. The circuits are therefore arranged and connected such that the interruption occurs when the number of words of data transferred becomes coincident with the number which has previously been given to the DMAC 43 as a parameter. This interruption is set as the interrupt request IRQ1 which is caused when data transfer is completed in relation to the channel 0 corresponding to the data input from the outside and the interrupt request IRQ2 which is caused when the data transfer is completed in relation to the channel 1 corresponding to the recording data output. However, the actual interruption operation is, as a matter of course, carried out when actual data transfer has been executed, as described later, rather than immediately after the system has been initialized. The portion of the main program 51 after interruption has been allowed is a normal processing. This portion of the program is arranged such that the process is caused to proceed cyclically while inquiring whether or not it is necessary for processing to be executed from inputs, outputs and flags. The first command input (in a step 55) which is delivered from an external device instructs this thermal recording apparatus to conduct a control operation. If this command input is available, the process proceeds to a step 56, where, for example, a mechanism portion (not shown) is controlled such as to feed paper, or a recording power source is turned on or off. The subsequent portion of the main program 51 is a starting processing of the recording data storing function, in which inquiry is made in a step 57 as to whether or not a buffer area for temporary storage is present in the RAM 47 and if so whether it has a vacant region which enables recording data to be input thereto. Further, determination is made in a step 58 as to whether or not recording data is being input to the RAM 47 in accordance with the state of the No. 1 flag, thereby preventing any double starting processing from taking place. Accordingly, if the input buffer (RAM 47) has a vacant region and recording data is not being input, the DMAC 43 is given in a step 59 a starting command which instructs the RAM 47 to store input data $D_0$ to $D_7$ therein in response to the DMA signal from the DMAC 43 on request from the input circuit 45, whereby a predetermined amount of data input is allowed and at the same time the No. 1 flag which represents the fact that recording data is being input is set in a step 60. In response to this starting command, the input circuit 45 requests the DMAC 43 to effect data transfer ($DRQ_1$), if an external input is fed thereto, and outputs request data $DRQ_0$ for DMA (data memory access) to the DMAC 43, which in turn outputs the BRQ signal to the microprocessor 42. When the BRQ signal is input to the microprocessor 42, it stops using the bus 44 and releases it for use by the DMAC 43, and further informs the DMAC 43 of this fact by the BACK signal. In response to the BACK signal, the DMAC 43 executes data transfer. It is to be noted that, when the data transfer is completed, the DMAC 43 stops delivering the BRQ signal to the microprocessor 42 and at the same time returns the right to use the bus 44 to the microprocessor 42. The DMAC 43 stores (WR) the input data $D_0$ to $D_7$ in the RAM 47 while specifying an address A by the DACK1 signal. Since the number of times of data transfer to be executed by the DMAC 43 has previously been programmed, when the number of times of input operations becomes coincident with that number, the AND circuit 60 outputs the AND of the transfer completion signal TC and the signal DACK0 which represents the DMA channel operation, whereby the interrupt request IRQ1 is generated. In the processing (IRQ1) corresponding to this interrupt, if the number of a group of pieces of input data is made to correspond to one scanning line of the thermal recording head, this interrupt completes data input for one scanning line and allows a recording operation in a step 65 shown in FIG. 5B. Then, one is added to the number of scanning lines of recording in a step 66. Further, the No. 4 flag is reset (OFF) in a step 67. Thus, it is possible according to the flow chart of the main program 51 shown in FIG. 5A to start the input channel while checking the degree by which recording proceeds, thereby allowing control to be effected such that the buffer does not overflow.

The recording operation completion interrupt request IRQ2 shown in FIG. 5C is generated in a step 69. The pulse which represents the completion of recording for one scanning line is given as the output of the shift register 52 after it has transferred the STB pulse (which is the latch timing for the IC 20) and all the blocks of the thermal recording head 1 have thereby been driven in order. When this interrupt occurs, one is subtracted from the number of scanning lines standing by for recording in a step 70, and the No. 5 flag is reset (OFF) in a step 71.

According to the present invention, the DMA completion timing IRQ2 is employed as the recording pulse generation starting timing. For this and other reasons, the arrangement of the thermal recording apparatus is simplified as compared with the conventional one. More specifically, the recording control is effected as follows. In the main program processing, the fact that data which can be recorded in the input buffer (RAM) has been input is known from the number of scanning lines waiting for recording in the step 61. If the No. 2 flag is not set (ON) in the step 62, the recording channel of DMA is started in the step 63 which outputs the signal DRQ1 for recording output which is generated in the DMAC 43, and the No. 3 flag is set (ON) in the step 64. By virtue of this arrangement, when the DMAC 43 refers to the RAM 47 for the purpose of reading out data, since the reference signals of the RAM 47 are coupled to the driver ICs 200 as recording control signals, a driver IC 200 which has an address equivalent to the low-order eight bits of the address of the RAM 47 is selected. At this time, the negative-logic AND circuit 57 which operates on inputting of the DACK1 (data transfer acknowledge) signal from the DMAC 43 and the write signal IOW generates the $\overline{WR}$ signal only when recording data is transferred from the RAM 47 to the selected driver IC 200 by means of DMA such that the recording data is written into the driver IC 200. Accordingly, the microprocessor 42 is able to handle the thermal recording head 1 in such a manner that it is equivalent to the RAM 47 incorporated in the microprocessor 42. Further, such an arrangement allows the recording data $D_0$ to $D_7$ to be transferred without being subjected to parallel-to-serial or serial-to-parallel conversion which is conventionally required. It is therefore possible to definitely obtain operation performance eight times as high as serial data transfer by making use of the operation performance of each element to its limit. Further, according to the present invention, there is no need to provide any parallel-serial or serial-parallel data transfer circuit which is conventionally required. It is therefore possible to reduce the number of transistor elements required for the driver 2. Conversely, it is advantageously possible to realize an IC having a larger number of output circuits than the conventional one with a chip size which is substantially the same as that of the conventional IC.

It is to be noted that the second interrupt processing (IRQ2) is carried out simply for confirming the completion of the recording pulse which is started subsequently to the DMA transfer in a circuit manner.

It is to be noted also that, although in the above-described embodiment the transfer of recording data is carried out by the DMAC 43, when it is not necessary to attain high recording speed, it is possible to allocate an address memory in the memory space of the microprocessor bus separately from the RAM. In such a case, although the number of software processings slightly increases, it becomes unnecessary to employ the DMAC 43, and it is possible to use a large number of memory reference commands of the microprocessor 42. For this purpose, each driver IC is preferably adapted to serve as a temporary storage register which enables data to be written into and read out from it. In FIG. 4: the reference symbol CLK1 represents a clock signal from the microprocessor 42; $A_0$ to $A_{15}$ address signals; $D_0$ to $D_7$ data signals, $I_0$ an interface signal; R a request signal; W a write signal; and M a memory signal.

Figure 7:
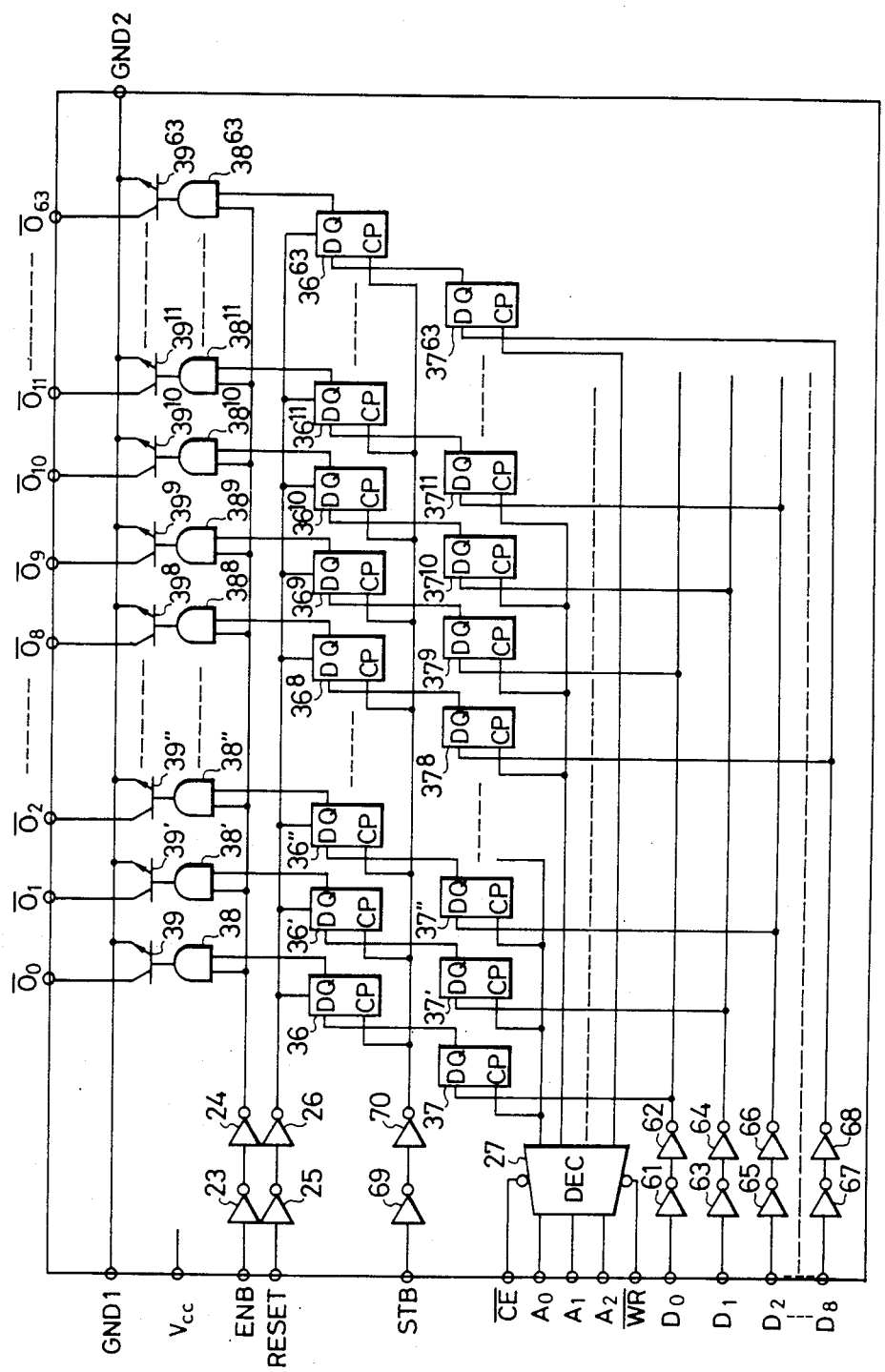
FIG. 7 shows another example of the driver circuit in accordance with the present invention.

Further, it is possible to prvide, as shown in FIG. 7, one or more stages of registers 36 to $36^{63}$ and inverting logic circuits 69, 70 in addition to the temporary storage registers for inputs to the IC chip, thereby to allow recording data to be transferred in parallel to the operation of outputting the recording pulse. In this case, although the number of elements (transistors) required for the driver IC 2 increases, such an arrangement is effective in making use of the operation speed of the apparatus to its limit. It is to be noted that the time scale B in FIG. 6 is set such as to be more than ten times as large as the time scale A.

As has been described above, the thermal recording apparatus according to the present invention is mainly constituted by the output drivers 39 to $39^{63}$, the gates 38 to $38^{63}$ and the latches 37 to $37^{63}$, while each of the driver circuits 200 which has the parallel data input terminals CE, $A_0$, $A_1$, $A^2$ and WR is connected to the microprocessor incorporated in the control circuit through the bus, and further the register of each driver circuit is set such as to be equivalent to a memory or the like which is connected to a microcomputer bus. Therefore, it is advantageously possible to increase the recording data transfer speed to a level eight times as high as that of the conventional serial data transfer type thermal recording apparatus and also to provide the thermal recording apparatus with various kinds of functions by employing commands from the microprocessor. Further, since it is possible for data to be transferred in parallel, it becomes unnecessary for the control circuit to incorporate a parallel-to-serial conversion circuit and for the driver to incorporate a serial-to-parallel conversion circuit. Thus, it is possible to reduce the number of required circuit elements to substantially half of the number of circuit elements required in the conventional serial data transfer type thermal recording apparatus.

What is claimed is:

1. In a thermal recording apparatus of the type having a thermal recording head with a plurality of heating elements, a driver circuit actuated in response to a recording signal, and a control circuit which controls said driver circuit, the improvement comprising said control circuit including a circuit which inputs recording data, a microprocessor which effects control for transferring said recording data to said driver circuit, a ROM which stores programs to control the operation of said microprocessor, a RAM to store data to be transferred to said driver circuit, a circuit which controls the energization time for recording effected by said driver circuit, and means for outputting the recording dtat in said RAM to said driver circuit, so that the recording data in said RAM, a signal representing the corresponding address where said recording data has been stored, and a write signal transmitted to said driver circuit from said outputting means are output to said driver circuit in parallel in response to a data transfer acknowledge signal from said outputting means.

2. A thermal recording apparatus according to claim 1, wherein said outputting means is constituted by a direct memory access controller.

3. A thermal recording apparatus according to claim 1, wherein said circuit which controls the energization time for recording effected by said driver circuit is constituted by a shift register.

4. A thermal recording apparatus according to claim 1, wherein said driver circuit includes a plurality of ON/OFF elements connected to said thermal recording head, gate means for ON/OFF controlling the output of each said ON/OFF element, register means connected to said gate means for temporarily storing said recording data, and means for effecting selective writing of recording data in parallel to said register means.

5. A thermal recording apparatus according to claim 4, wherein said means for effecting said selective writing in said register means includes a decoder.

6. A thermal recording apparatus according to claim 5, wherein said decoder is adapted to output to said register means a selection signal for said register in accordance with said corresponding address signal and said write signal.

7. A thermal recording apparatus according to claim 6, wherein said register means is actuated by said selection signal and said recording data such as to deliver its output to said gate means.

8. A thermal recording apparatus according to claim 7, wherein said gate means is gated by an output signal from said shift register.

9. A thermal recording apparatus according to claim 1, further comprising at least one further register means provided between said gate means and said register means and connected to said gate means and actuated by an output signal from said outputting means.

* * * * *